United States Patent
Duvdevani et al.

(10) Patent No.: US 10,630,800 B2
(45) Date of Patent: Apr. 21, 2020

(54) METHODS AND SYSTEMS FOR HANDLING REQUESTS REGARDING ZERO-RATING

(71) Applicant: Facebook, Inc., Menlo Park, CA (US)

(72) Inventors: Itay Duvdevani, Rosh HaAyin (IL); Dekel Shmuel Naar, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 192 days.

(21) Appl. No.: 15/232,656

(22) Filed: Aug. 9, 2016

(65) Prior Publication Data

US 2018/0048729 A1   Feb. 15, 2018

(51) Int. Cl.
*H04L 29/08* (2006.01)
*H04L 29/12* (2006.01)

(52) U.S. Cl.
CPC ...... *H04L 67/2814* (2013.01); *H04L 61/1511* (2013.01); *H04L 61/6013* (2013.01); *H04L 67/02* (2013.01); *H04L 67/10* (2013.01); *H04L 67/20* (2013.01); *H04L 67/28* (2013.01)

(58) Field of Classification Search
CPC ........... G06F 12/1027; H04L 29/12358; H04L 29/12367; H04L 61/2514
See application file for complete search history.

(56) References Cited

U.S. PATENT DOCUMENTS

| | | | |
|---|---|---|---|
| 9,692,909 B2* | 6/2017 | Tubi | H04M 15/39 |
| 10,277,701 B2* | 4/2019 | Schejter | H04L 67/2814 |
| 2012/0005299 A1* | 1/2012 | Xu | H04L 29/12358 |
| | | | 709/208 |
| 2013/0290563 A1* | 10/2013 | Fleischman | H04L 61/1511 |
| | | | 709/245 |
| 2013/0326004 A1* | 12/2013 | Zizka | H04L 61/1511 |
| | | | 709/217 |
| 2016/0308821 A1* | 10/2016 | Siba | H04L 61/2007 |
| 2017/0374017 A1* | 12/2017 | Gautam | H04L 61/1511 |

\* cited by examiner

*Primary Examiner* — Barbara B Anyan
(74) *Attorney, Agent, or Firm* — Morgan, Lewis & Bockius LLP

(57) ABSTRACT

Methods and systems for processing requests by a computing device (e.g., a user device) are disclosed. The user device is coupled to a server system (e.g., a proxy server). The user device detects a DNS lookup request including a domain name and generates a first response to the DNS lookup request. The first response includes a synthesized IP address associated at the computing device with the domain name. The user device detects a connection request subsequent to the first response. The connection request includes the synthesized IP address. The user device modifies the connection request. In some embodiments, the user device replaces the synthesized IP address in the connection request with the domain name. The user device further forwards the connection request to a server.

10 Claims, 11 Drawing Sheets

450

480

500

---

516
The DNS lookup request and the connection request are generated by a first application running on the computing device

518
Check an application ID included in the DNS lookup request to identify that the DNS lookup request is generated by the first application

520
The first response is generated by a second application running on the computing device, the second application being distinct from the first application;
send the first response from the second application to the first application

522
The second application provides access to zero-rated web services

524
Generate, by the second application, the synthesized IP address; and store the synthesized IP in the computing device

526
The synthesized IP address is generated randomly at the computing device

---

528
Generate a first packet corresponding to the first request, wherein the first packet is a UDP DNS packet

530
Generate a second packet corresponding to the second request, wherein the second packet is a TCP packet

532
The DNS lookup request is a first request of a plurality of DNS lookup requests including respective domain names;
respond to the plurality of DNS lookup requests with responses including respective synthesized IP addresses associated at the computing device with the respective domain names; and
within the computing device, each synthesized IP address is unique to a respective domain name

534
The connection request is a first connection request

536
Detect a second connection request including an IP address that is not one of the synthesized IP addresses

538
In accordance with a determination that the second connection request does not include one of the synthesized IP addresses, drop the second connection request

Figure 5C

METHODS AND SYSTEMS FOR HANDLING REQUESTS REGARDING ZERO-RATING

TECHNICAL FIELD

This relates generally to network communications, including but not limited to processing requests by a computing device to identify destination domain names of respective requests to avoid paid data leakage.

BACKGROUND

Mobile devices have become an increasingly dominant means through which consumers access, download, and consume electronic content over the Internet.

Despite substantial advancements in telecommunications technology, however, affordable access to the Internet remains relatively low. Considering the limited affordability of Internet access in certain geographic regions, such as developing countries, consumers often have difficulty accessing the Internet and therefore are often left frustrated when using mobile devices. Recently, zero-rated Internet service has become an increasingly popular option to improve the affordability of Internet access. It is beneficial to serve the zero-rated content efficiently and effectively to the consumers.

SUMMARY

Accordingly, there is a need for methods, devices, and systems for improving network operability, for managing data exchanged between user devices and web servers, and for avoiding data leakage (e.g., a paid data leakage). Embodiments set forth herein are directed to methods, devices, and systems for processing requests by a user device. Zero-rated (e.g., free) access to certain content (e.g., zero-rated content) on the Internet may be provided to users at no cost, while non-zero-rated (e.g., paid) access to other content (e.g., non-zero-rated content) on the Internet may also be offered on other terms. By having a proxy server route traffic exchanged between user devices and web servers, the user devices can access the Internet at predetermined rates or at no cost.

Because a single IP address may correspond to a plurality of domain names that provide content with different pricing policies, it may not be conclusive, by using an IP address solely, to check the pricing policies of the content requested by a user device. For example, "www.google.com" and "www.youtube.com" may be hosted by a same web server, and thus may share the same IP address. However, content provided by Google.com and YouTube.com may not be identically rated. For example, text content from "www.google.com" may be zero-rated, whereas video content from "www.youtube.com" may be non-zero-rated. Accordingly, there is a need to identify the domain name to which each request is directed and to check the domain name against a whitelist of content approved for zero-rating to make sure that only zero-rated content is provided during a zero-rated session.

By using the methods, devices, and systems for processing requests discussed in the present disclosure, a unique synthesized IP address is assigned to each domain name for distinguishing respective domain names from each other, such as "www.google.com" and "www.youtube.com." The synthesized IP can be used in conjunction with the existing Internet communication protocol (e.g., TCP/IP) to pass the domain name information to the proxy server. The proxy server then can check the domain name to understand which domain the user is requesting content from (instead of only seeing the IP address). Furthermore, all requests from the user device can be guaranteed to be forwarded to the proxy server for checking the requested domain names against a whitelist for zero-rating to avoid paid data leakage.

In accordance with some other embodiments, a computer-implemented method is performed at a computing device (e.g., a user device) with one or more processors and memory storing instructions for execution by the one or more processors. The user device is coupled to a server system (e.g., a proxy server). The method includes detecting a DNS lookup request including a domain name. The method further includes generating a first response to the DNS lookup request. The first response includes a synthesized IP address associated at the computing device with the domain name. The method includes detecting a connection request subsequent to the first response. The connection request includes the synthesized IP address. The user device modifies the connection request. In some embodiments, the user device replaces the synthesized IP address in the connection request with the domain name. The user device further forwards the connection request to a server.

In accordance with some embodiments, a server system (e.g., a proxy server) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the electronic device, cause the electronic device to perform the operations of the above method.

In accordance with some embodiments, a computer-implemented method is performed at a server system (e.g., a proxy server) with one or more processors and memory storing instructions for execution by the one or more processors. The proxy server is coupled to a plurality of client devices and a plurality of web servers. The method includes receiving a request from a client device, wherein the request includes a domain name. The method also includes validating whether the domain name corresponds to a zero-rated web site. In accordance with a determination that the domain name corresponds to a zero-rated web site, the proxy server forwards the request to a web server in accordance with the domain name.

In accordance with some embodiments, a computing device (e.g., a user device) may include one or more processors, memory, and one or more programs; the one or more programs are stored in the memory and configured to be executed by the one or more processors. The one or more programs include instructions for performing the operations of the above method. In accordance with some embodiments, a non-transitory computer-readable storage medium has stored therein instructions that, when executed by the electronic device, cause the electronic device to perform the operations of the above method.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 5A-5C are a flow diagram illustrating a method for handling requests at a user device, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first application could be termed a second application, and, similarly, a second application could be termed a first application, without departing from the scope of the various described embodiments. The first application and the second application are both applications, but they are not the same application.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
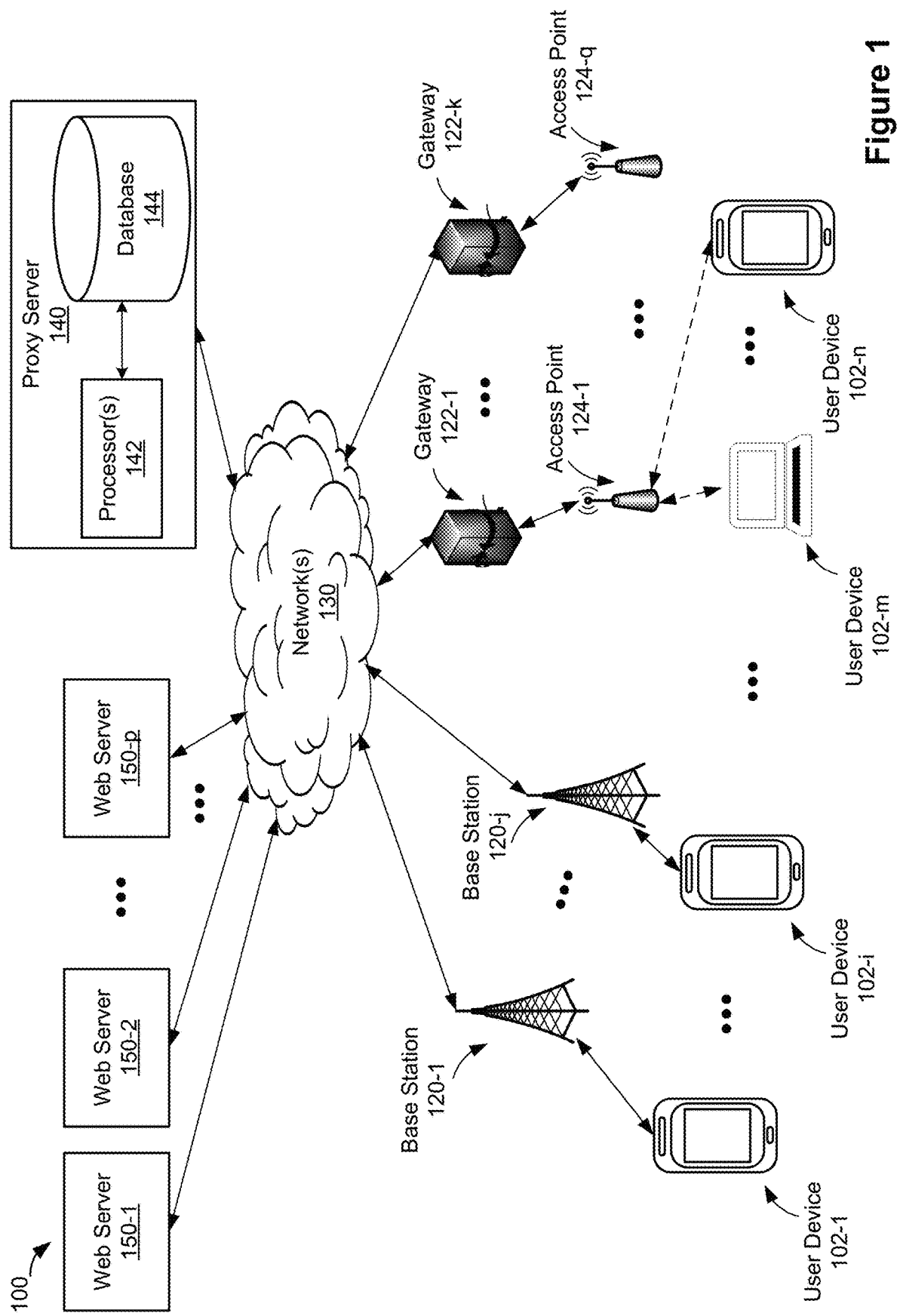
FIG. 1 is a block diagram illustrating a network architecture for providing network services, in accordance with some embodiments.

FIG. 1 illustrates a network architecture 100 in accordance with some embodiments. The network architecture 100 allows mobile carriers (and/or network providers) to provide one or more subscribers (e.g., users) Internet service with one or more pricing policies, e.g., for free (e.g., zero-rated), at special pricing, or at regular pricing. For example, a mobile carrier assigns respective pricing policies to IP addresses or domain names (e.g., domain addresses, host names, host addresses, URLs) associated with one or more web servers that provide Internet content to subscribers. The creation of the pricing policies also takes into consideration subscriber account types (e.g., pre-paid, zero-balanced, etc.), subscriber phone numbers, subscriber IP addresses, requested content types, applications running on subscriber devices, and/or other device features.

The network architecture 100 routes the traffic from one or more subscriber devices to destination IP addresses using predetermined pricing policies (e.g., free, special pricing, or regular pricing). The network architecture 100 thus provides various products and/or functionalities (e.g., a Free Basics user interface for zero-rated content) to the subscribers.

In some embodiments, a subscriber device can access one or more predetermined IP addresses or one or more predetermined domain names in accordance with predetermined pricing policies. For example, for zero-rating service, a subscriber device can download, upload, and/or view a webpage or use an application associated with a predetermined IP address or a predetermined domain name for free, without being charged for network access. Thus these types of predetermined IP addresses or domain names are called zero-rated content providers. The content from zero-rated web pages and/or applications is called zero-rated content.

In another example, for specially priced services, a network operator may provide promotions, such as discounted pricing, for accessing certain IP addresses or certain domain names, and/or certain content types (e.g., texts and/or images) from certain IP addresses or certain domain names. The specially priced services may be provided to certain subscribers as selected by the network operator.

In yet another example, for regularly priced services, a subscriber device can access one or more IP addresses or one or more domain names that are not zero-rated or specially priced by paying regular service fees. In some embodiments, one or more IP addresses or one or more domain names that are neither zero-rated nor specially priced are treated as regularly priced. The IP addresses or domain names that require paid network access are called non-zero-rated content providers, which include regular-priced content providers and special-priced content providers. The content provided by the non-zero-rated content providers is called non-zero-rated content, which includes regular-priced content and special-priced content.

The network architecture 100 includes client-side modules (e.g., as discussed with reference to FIG. 2) executed on a number of user devices (also called "client devices," "client systems," "client computers," "subscriber devices," or "clients") 102-1 . . . 102-i . . . 102-m . . . 102-n and server-side modules (e.g., as discussed with reference to FIG. 3) executed on one or more server systems, such as a proxy server 140 and/or one or more web servers 150-1, 150-2 ... 150-p. The user devices 102 communicate with the server systems (e.g., the proxy server 140 and/or the one or more web servers 150) through one or more networks 130 (e.g., the Internet, cellular telephone networks, mobile data networks, other wide area networks, local area networks, metropolitan area networks, and so on). Client-side modules provide client-side functionalities for the network service platform (e.g., zero-rated Internet service, special priced Internet service, and regularly priced Internet service) and communications with server-side modules. Server-side modules provide server-side functionalities for the network service platform (e.g., routing network traffic, serving internet content with specific pricing policies, and/or managing user account information) for any number of user devices 102.

In some embodiments, the user devices 102 are mobile devices and/or fixed-location devices. The user devices 102 are associated with subscribers (not shown) who employ the user devices 102 to access one or more IP addresses or domain names (e.g., including zero-rated content providers and/or non-zero-rated content providers). The user devices 102 execute web browser applications and/or other applications that can be used to access the one or more IP addresses or domain names. In some embodiments, a user device 102 processes requests for network services and forwards the requests from the user device 102 to the proxy server 140. The requests for network services include, but are not limited to, one or more Domain Name System (DNS) requests and one or more Transmission Control Protocol (TCP) requests.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the proxy server 140.

In some embodiments, the network architecture 100 includes one or more base stations 120-1 ... 120-j for carrier networks that provide cellular service to the user devices 102. One or more network operators (e.g., network service providers, network carriers, or cellular companies) own or control the one or more base stations 120 and related infrastructure. For example, the base station 120 communicably connects one or more user devices 102 (e.g., 102-1) to one another (e.g., 102-i) and/or to the networks 130. In some embodiments, the network architecture 100 includes one or more gateways 122-1 ... 122-k connected to one or more wireless access points 124-1 ... 124-q respectively for providing Wi-Fi networks to the user devices 102 (e.g., 102-m, 102-n). The base stations 120 and the gateways 122 are responsible for routing traffic between the networks 130 and the user device 102.

In some embodiments, the proxy server 140 is implemented on one or more standalone computers or on a distributed network of computers. In some embodiments, the proxy server 140 also employs various virtual devices and/or services of third party service providers (e.g., cloud computing) to provide the underlying computing resources and/or infrastructure resources of the proxy server 140. The proxy server 140 includes one or more processors 142 and one or more databases 144. The one or more processors 142 process requests for respective network services from the user devices 102, and route or forward requests to corresponding web servers 150 to provide the network services with corresponding pricing policies. The database 144 stores various information, including but not limited to information related to subscribers, information related to network operators, and/or pricing policies.

In some embodiments, the one or more web servers 150-1, 150-2 ... 150-p include social networking servers configured to host various social networking functionalities. In some embodiments, the one or more web servers 150-1, 150-2 ... 150-p include third-party servers configured to provide other types of services. Exemplary third-party services include social networking, book sales, book reviews sharing, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given web server 150 hosts a website that provides web pages to user devices 102. Alternatively or additionally, a given web server 150 hosts an application that is used by user devices 102. As discussed above, the proxy server 140 may route or redirect requests from user devices 102 to respective web servers 150. In some embodiments, the proxy server 140 uses inline frames ("iframes") to nest independent websites within a web page (e.g., a zero-rated, a regular-priced, or a special-priced web page). In some embodiments, the proxy server 140 uses iframes to enable third-party developers to create applications that are hosted separately by a web server 150 (e.g., a third-party server), but operate within a user session and are accessed through the user's profile in the proxy server 140. In some embodiments, a given web server 150 is used to provide third-party content (e.g., news articles, reviews, message feeds, etc.). In some embodiments, a given web server 150 is a single computing device, while in other embodiments, a given web server 150 is implemented by multiple computing devices working together to perform the actions of a server system (e.g., cloud computing).

In some embodiments, respective IP addresses or respective domain names associated with one or more web servers 150 are predetermined to be zero-rated content providers that are configured to provide zero-rated content to the user devices 102. A user device 102 does not need to pay data usage fees to a network provider for viewing, downloading, and/or uploading data to or from the one or more zero-rated content providers. In some embodiments, respective IP addresses or respective domain names associated with one or more web servers 150 are non-zero-rated content providers (e.g., regular-priced or special-priced) that provide non-zero-rated (e.g., paid) content. A user device 102 pays a data usage fee to a network provider for viewing, downloading, and/or uploading data to or from the one or more non-zero-rated content providers.

In some embodiments, a single web server 150, e.g., web server 150-1, is configured to host two or more domain names, e.g., www.google.com and www.youtube.com. In some embodiments, a first domain name (e.g., www.google.com) is configured to provide zero-rated content to one or more user devices 102 and a second domain name (e.g., www.youtube.com) is configured to provide non-zero-rated content to one or more user devices 102. The single web server 150 is configured to host the functionalities and content of the respective two or more domain names. The single web server 150 is assigned with a single IP address. Under certain communication protocols (e.g., TCP/IP), IP addresses are used for identifying the destinations of requests (e.g., packets). Thus, there is a need for a process to distinguish requests from user devices 102 for different domain names that may have the same IP address to avoid inadvertent paid data leak on the user devices 102.

Figure 2:
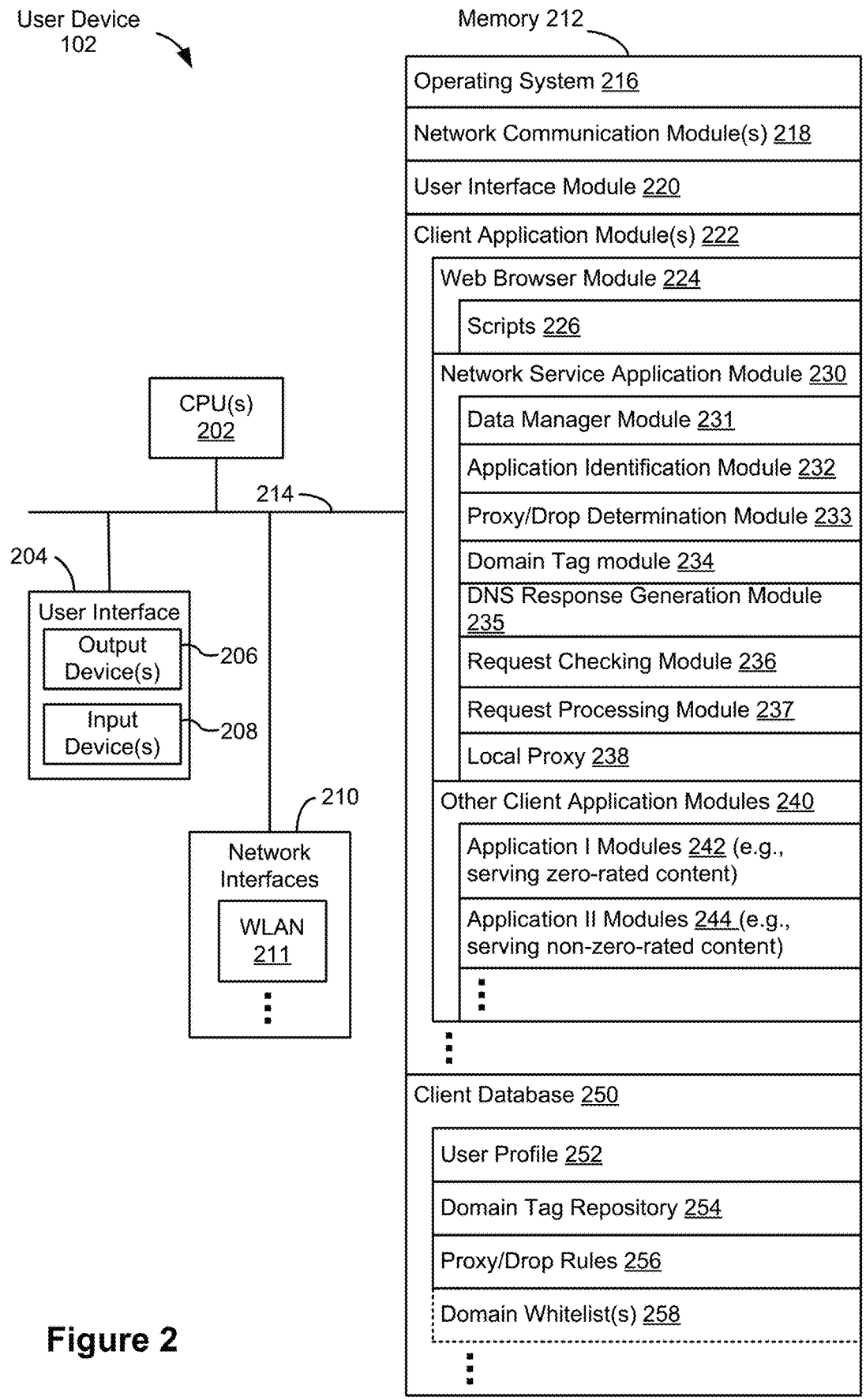
FIG. 2 is a block diagram illustrating a user device, in accordance with some embodiments.

FIG. 2 is a block diagram illustrating an exemplary user device 102 (e.g., one of the user devices 102-1 through 102-n, FIG. 1) in accordance with some embodiments. The user device 102 typically includes one or more central processing units (CPU(s)) (e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 102 includes a user interface 204, including output device(s) 206 and input device(s) 208. In some embodiments, the input devices include a keyboard or a track pad. Alternatively, or in addition, the user interface 204 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 206 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a GPS (global positioning satellite) or other geo-location receiver, and/or location-detection software for determining the location of the user device 102.

In some embodiments, the one or more network interfaces 210 include wireless and/or wired interfaces for receiving data from and/or transmitting data to other user devices 102, the proxy server 140, the web servers 150, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 210 includes a wireless LAN (WLAN) interface 211 for enabling data communications with other WLAN-compatible devices and/or the proxy server 140 (via the one or more network(s) 130, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware dependent tasks;

network communication module(s) 218 for connecting the user device 102 to other computing devices (e.g., the proxy server 140, the web servers 150, other user devices 102, and/or other devices) via the one or more network interface(s) 210 (wired or wireless);

a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);

one or more client application modules 222, including the following modules (or sets of instructions), or a subset or superset thereof:

a web browser module 224 (e.g., Internet Explorer by Microsoft, Firefox by Mozilla, Safari by Apple, Opera by Opera Software, or Chrome by Google) for accessing, viewing, and interacting with web sites (e.g., zero-rated and/or non-zero rated web sites), which includes:

scripts 226 for the network service platform provided by the proxy server 140 (e.g., as embedded in a web page) and executed by the web browser module 224; and a network service application module 230 for providing one or more functionalities related to network services provided by the proxy server 140. For example, the application module 230 may process a request generated by another application (e.g., Application I 242) running on the user device 102, and may forward the request to the proxy server 140. The network service application module 230 includes:

data manager module 231 for exchanging data packets between the operating system kernel (e.g., kernel 404, FIG. 4A) and the network service application 230;

application identification module 232 for checking an application ID associated with a packet to identify which application the packet originated from;

proxy/drop determination module 233 for determining whether to proxy or to drop a packet by checking against predetermined rules (e.g., proxy/drop rules 256);

domain tag module 234 for generating synthesized IP addresses in association with domain names respectively and for storing mappings between synthesized IP addresses and domain names in the client database 250 (e.g., domain tag repository 254);

DNS response generation module 235 for generating DNS response messages using synthesized IP addresses;

request checking module 236 for checking the cached mappings between synthesized IP addresses and domain names to identify a certain domain name for a given synthesized IP address;

request processing module 237 for processing connection requests by replacing a synthesized IP address in the connection request with a domain name associated with the synthesized IP address; and local proxy 238 for forwarding processed requests (e.g., packets) from the user device 102 to the proxy server 140; and other optional client application modules 240, such as applications for social networking, word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support. The other client application modules 240 includes:

Application I module 242 is associated with a first domain name that is configured to provide zero-rated content; and Application II module 244 is associated with a second domain name that is configured to provide non-zero-rated content. In some embodiments, Application I 242 and Application II 244 correspond to distinct domain names for hosting different contents and/or features. The first and second domain names are provided by a single server system (e.g., web server 150-1) corresponding to the same IP address; and client database 250 for storing data associated with the network service platform, including, but is not limited to:

user profile 252 storing a user profile associated with the user of a client device 102 including, but not limited to, user account information, login credentials to the network service platform, payment data (e.g., linked credit card information, app credit or gift card balance, billing address, shipping address, etc.), bookmarked links (including zero-rated and/or non-zero rated), custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information;

domain tag repository 254 storing mappings between synthesized IP addresses and domain names respectively; and proxy/drop rules 256 storing rules that can be used to determine whether to process or to drop a packet; and optionally, domain whitelist(s) 258 storing one or more domains that are predetermined to provide zero-rated content to the user device 102-1.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 3:
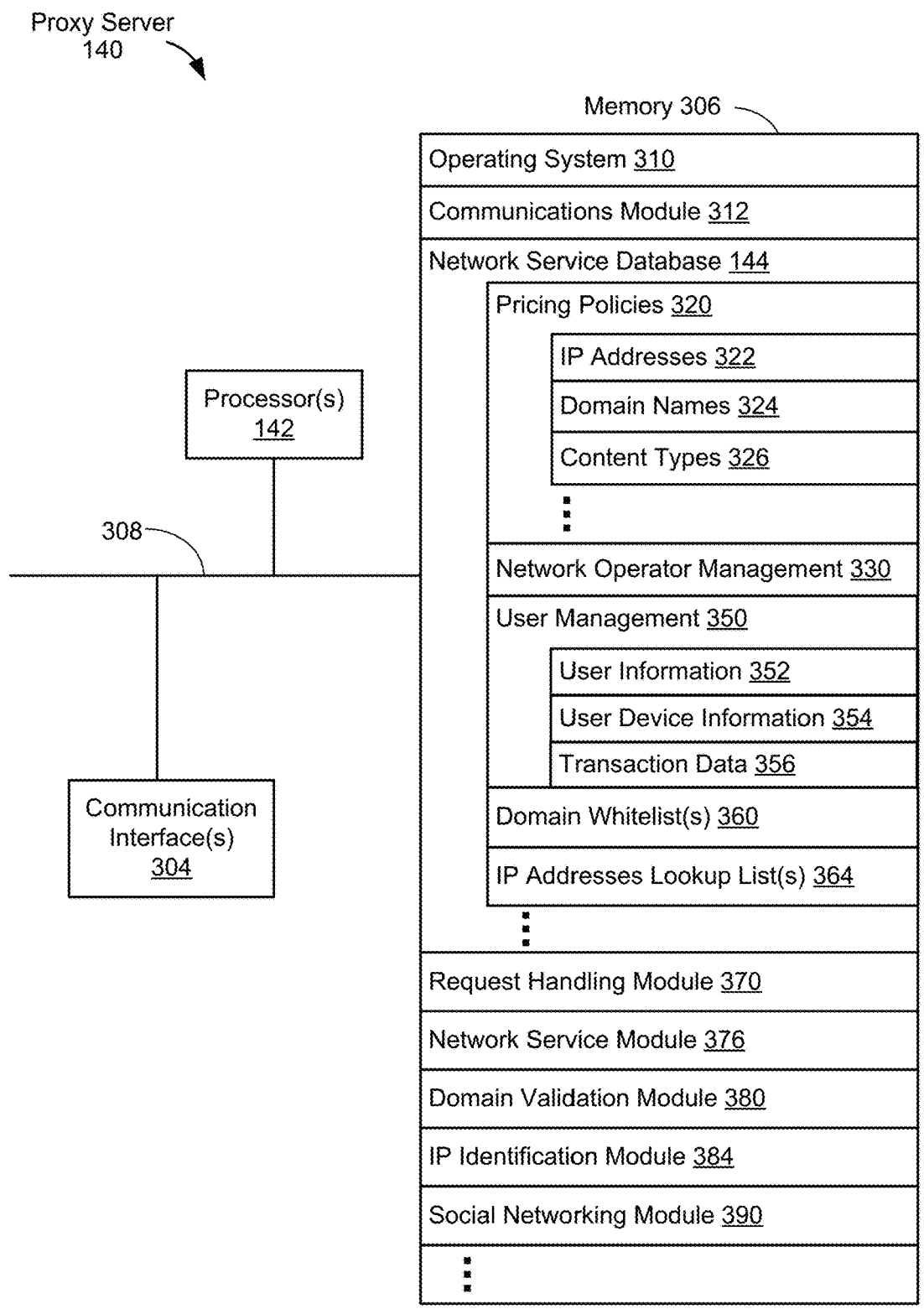
FIG. 3 is a block diagram illustrating a proxy server, in accordance with some embodiments.

FIG. 3 is a block diagram illustrating an exemplary proxy server 140 in accordance with some embodiments. The proxy server 140 includes one or more processing units (processors or cores) 142, one or more network or other communications interfaces 304, memory 306, and one or more communication buses 308 for interconnecting these components. The communication buses 308 optionally include circuitry (sometimes called a chipset) that interconnects and controls communications between system components. The proxy server 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 142. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

an operating system 310 that includes procedures for handling various basic system services and for performing hardware dependent tasks;

a network communication module 312 that is used for connecting the proxy server 140 to other computers via the one or more communication network interfaces 304 (wired or wireless) and one or more communication networks (e.g., the one or more networks 130);

a network service database 144 for storing data associated with the network service platform, which includes:

pricing policies 320, including but not limited to:

IP addresses 322 including, but not limited to, one or more predetermined zero-rated IP addresses, special-priced IP addresses, and/or regular-priced IP addresses;

domain names 324 including, but not limited to, one or more predetermined zero-rated domain names, special-priced domain names, and/or regular-priced domain names; and content types 326 including, but not limited to, one or more content types (e.g., texts, images, and/or videos) for retrieval by the user devices 102 with predetermined pricing policies; and network operator management information 330 including network operator information such as network segment information, network type, IP addresses and/or IP address blocks hosted by a respective network operator, etc.;

user management information 350, including but not limited to:
- user information 352 such as user profiles, login information, privacy and other preferences, biographical data, and the like. In some embodiments, for a given user, the user information 352 includes data associated with the user's name, profile picture, contact information, birth date, sex, marital status, family status, employment, education background, preferences, interests, and/or other demographic information;
- user device information 354 including, but not limited to, user device type, user device MAC address, Electronic Serial Number (ESN), International Mobile Station Equipment Identity (IMEI), Mobile Equipment Identifier (MEID), and/or other type(s) of user device identifier(s); and
- transaction data 356 including, but not limited to, payment data (such as account balance, credit card information, app credit or gift card balance, billing address, shipping address, etc.) and/or purchased items (such as a network service type, data pack, etc.); and
- domain whitelist(s) 360 storing one or more lists of domain names that are determined to provide zero-rated content to one or more user devices 102; and
- IP addresses lookup list(s) 364 storing IP addresses used on the Internet for respective domain names; and a request handling module 370 for handling and responding to requests from user devices 102, and for forwarding and routing requests or packets to corresponding web servers 150;

a network service module 376 for providing network service (e.g., Free Basics service) with various pricing policies and related features (e.g., in conjunction with browser module 224 or application module 230 on the user device 102, FIG. 2);

a domain validation module 380 for validating the domain names included in the requests against the domain whitelist(s) 360;

an IP identification module 384 for identifying IP addresses for respective domain names included in the requests by checking the IP address lookup list(s) 364; and a social networking module 390 for providing social-networking services and related features (e.g., in conjunction with web browser module 224 or a social network application client module on the client device 102, FIG. 2).

In some embodiments, the network service module 376 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 4A:
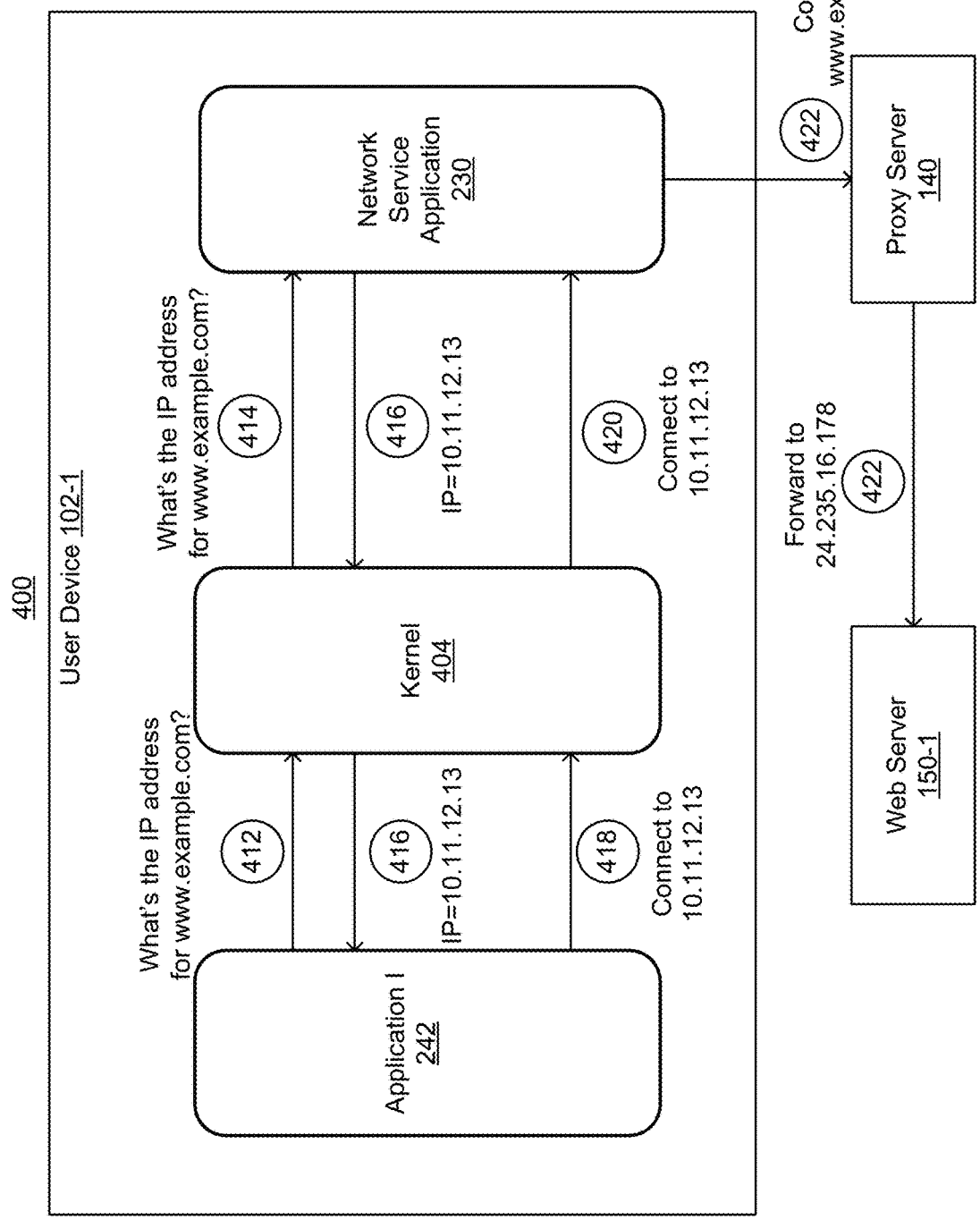
FIG. 4A is a diagram illustrating a packet transmission, in accordance with some embodiments.
Figure 4B:
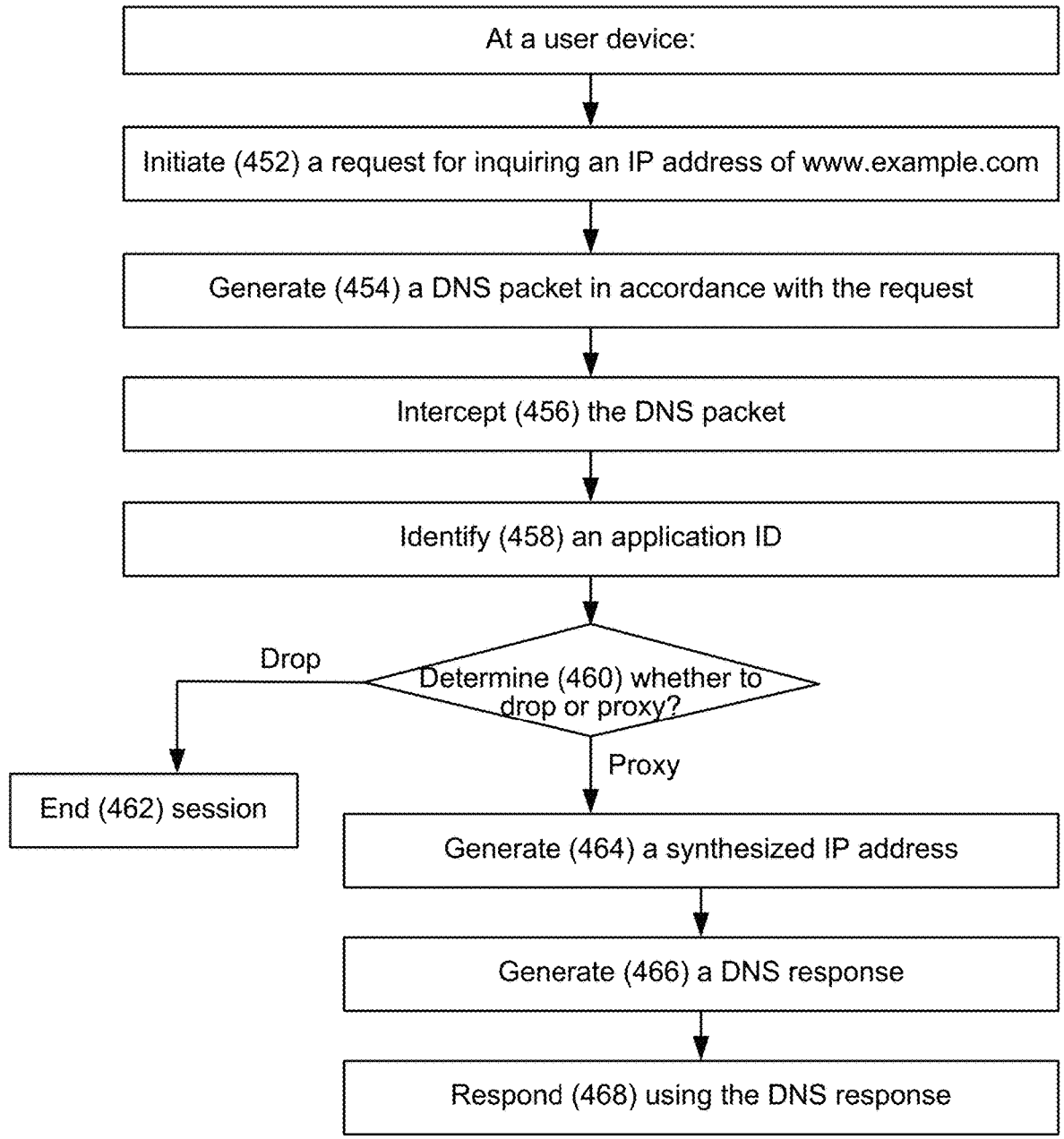
FIG. 4B is a flow diagram illustrating a process for processing a DNS request at a user device, in accordance with some embodiments.
Figure 4C:
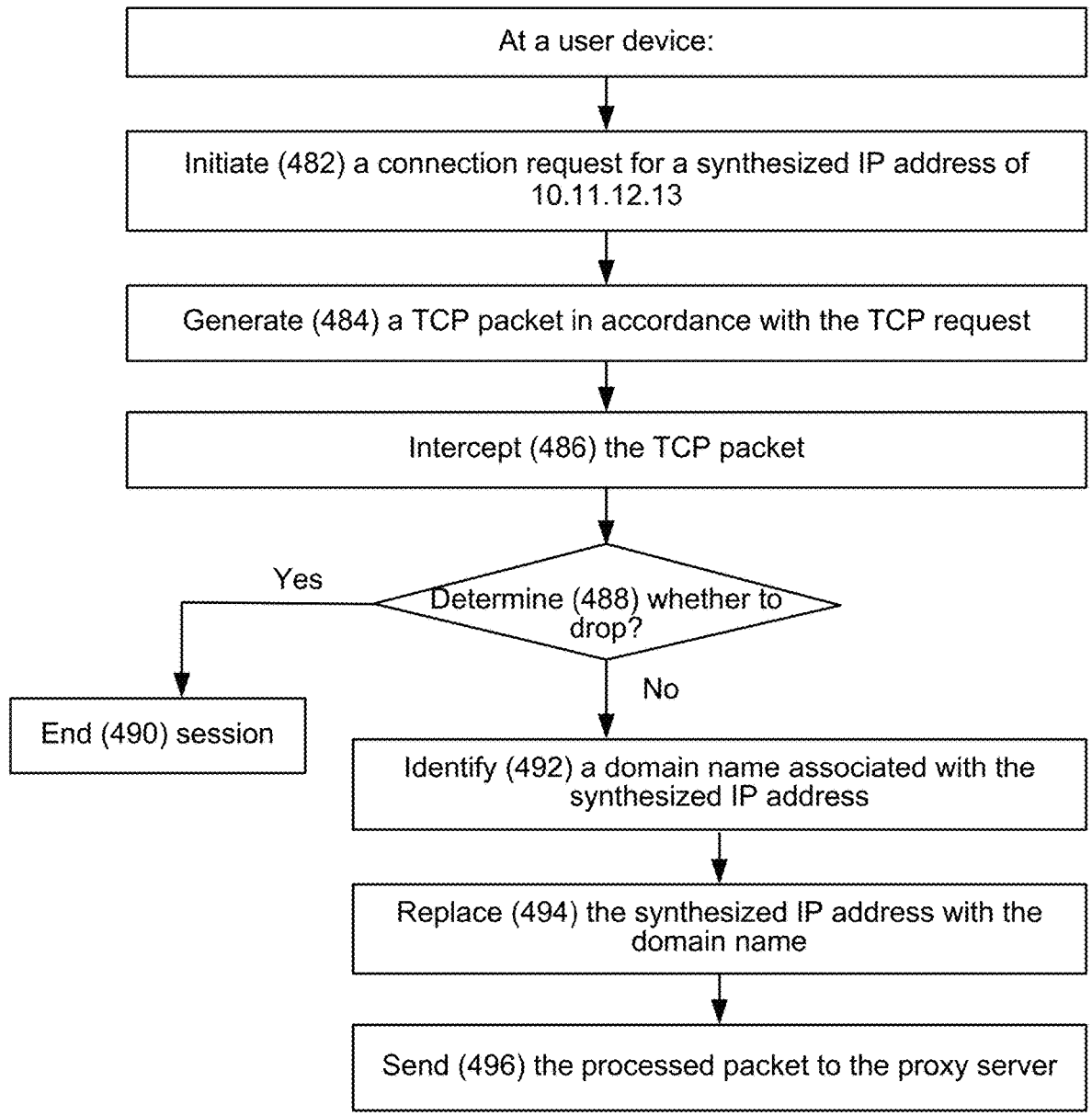
FIG. 4C is a flow diagram illustrating a process for processing a connection request at a user device, in accordance with some embodiments.

FIG. 4A is a diagram illustrating a packet transmission process 400, in accordance with some embodiments. FIG. 4B is a flow diagram illustrating a process 450 for processing a DNS request at the user device 102-1, in accordance with some embodiments. FIG. 4C is a flow diagram illustrating a process 480 for processing a connection request at the user device 102-1, in accordance with some embodiments. One or more steps of the process 400, process 450, and process 480 are performed by a user device 102 (e.g., user device 102-1, FIGS. 1-2), the proxy server 140 (FIGS. 1 and 3), and a web server 150 (e.g., web server 150-1, FIG. 1). Operations performed in process 400, process 450, and process 480 correspond to instructions stored in computer memories (e.g., memories 212, FIG. 2 and memories 306, FIG. 3) or other computer-readable storage mediums.

A process for handling a DNS request at the user device 102-1 is discussed with reference to FIGS. 4A-4B. In some embodiments, an application running on the user device 102-1 (e.g., Application I module 242, FIG. 2) issues (452, FIG. 4B) a request 412 for obtaining an IP address of a domain name. For example, in order to establish a connection session between the user device 102-1 and the domain "www.example.com" hosted by the web server 150-1, Application I 242 issues the request 412 to obtain an IP address of the domain "www.example.com." In some embodiments, the request 412 is a DNS request.

Application I 242 sends the request 412 to kernel 404 of the operating system running on the user device 102-1. In some embodiments, the operating system on the user device 102-1 is Android system. Kernel 404 is in charge of, among other features, managing input/output requests from software programs running on the user device 102-1, translating the requests into data processing instructions for the CPU(s) 202, and managing memories 212, the output device(s) 206, and the input device(s) 208 of the user device 102-1. In some embodiments, kernel 404 generates (454, FIG. 4B) a packet 414 in accordance with the request 412. In some embodiments, packet 414 is a DNS lookup request (e.g., a DNS query) that has a format that is in consistent with and supported by the DNS protocol. The DNS lookup request is used for obtaining the IP address of the domain "www.example.com" which is hosted by the web server 150-1. Packet 414 includes a field specifying the destination domain name "www.example.com." In some embodiments, the domain "www.example.com" is a zero-rated domain, and the request 412/packet 414 is related to a zero-rated connection session, e.g., including downloading and/or uploading zero-rated content. In some embodiments, packet 414 is a User Datagram Protocol (UDP) packet/UDP request.

In some embodiments, the network service application 230 (e.g., the data manager module 231, FIG. 2) intercepts (456, FIG. 4B) packet 414 from kernel 404 before packet 414 leaves the user device 102-1. In some embodiments, the network service application 230 (e.g., the application identification module 232, FIG. 2) identifies (458, FIG. 4B) from which application the request 412/packet 414 originated. In some embodiments, the application identification module 232 checks an application ID included in packet 414. For example, the application identification module 232 recognizes that the request 412/packet 414 is issued by Application I module 242 by identifying an application ID of Application I 242.

In some embodiments, the network service application 230 (e.g., proxy/drop determination module 233, FIG. 2) determines (460, FIG. 4B) whether to proxy (e.g., by a synthesized IP address) packet 414 or to drop packet 414. In some embodiments, the proxy/drop determination module 233 checks against the proxy/drop rules 256 (FIG. 2) to determine whether to proxy or to drop packet 414.

In some embodiments, the proxy/drop determination module 233 determines whether packet 414 is a DNS query. When the proxy/drop determination module 233 determines that packet 414 is not a DNS query, the proxy/drop determination module 233 further determines whether packet 414 is a TCP packet. When the proxy/drop determination module 233 determines that packet 414 is neither a DNS request nor a TCP packet, packet 414 is dropped (460—Drop, FIG. 4B), and the current session initiated from Application I 242 is terminated (462, FIG. 4B). In some embodiments, when the proxy/drop determination module 233 determines that packet 414 is a DNS query, the network service application 230 proceeds to proxy packet 414 (460—Proxy, FIG. 4B)

Optionally, in some embodiments, the proxy/drop determination module 233 checks against the domain whitelist(s) 258 in the client database 250 to determine whether content provided by the identified domain name in packet 414 (e.g., www.example.com) is zero-rated. When the proxy/drop determination module 233 determines that the domain name is included in the domain whitelist(s) 258, packet 414 is not dropped. However, when the proxy/drop determination module 233 determines that domain name is not included in the domain whitelist(s) 258, packet 414 is dropped, and the current session is terminated. Optionally, in other embodiments, the user device 102-1 does not store any domain whitelist or blacklist, and whether the requested domain is zero-rated or not is not checked at the user device 102-1.

In accordance with a determination that packet 414 is to be proxied (460—Proxy, FIG. 4B), the network service application 230 (e.g., domain tag module 234) generates (464, FIG. 4B) a synthesized IP address to be associated with the domain name. For example, the domain tag module 234 generates a synthesized IP address of 10.11.12.13 to be associated with the domain name www.example.com. In some embodiments, the synthesized IP address is randomly generated. The synthesized IP address complies with Internet Protocol. In some embodiments, the synthesized IP address uses 32-bit numbers and complies with the IPv4 protocol. Alternatively, the synthesized IP address uses 128-bit numbers and complies with IPv6 protocol. The domain tag module 234 also stores a relationship mapping between the generated synthesized IP address and the domain name, e.g., www.example.com=10.11.12.13, in the domain tag repository 254 (FIG. 2). In some embodiments, the synthesized IP address is marked as a synthesized IP address, (e.g., a fake IP address, a tag, or a proxy), as opposed to a real IP address used on Internet to be associated with the domain name. In some embodiments, the synthesized IP address is generated and stored locally on the user device 102-1. In some embodiments, the synthesized IP address is associated with the domain name locally on the user device 102-1. For example, when later another DNS request is initiated on the user device 102-1 and inquires about the IP address for the same domain name, e.g., www.example.com, the same synthesized IP address, e.g., 10.11.12.13, is used. However, the synthesized IP address is not associated with the domain name at DNS level outside the user device 102-1.

In response to the DNS query 414, the network service application 230 (e.g., DNS response generation module 235) generates (466, FIG. 4B) a DNS response 416 using the synthesized IP address. The generated DNS response 416 has a certain field specifying the synthesized IP address, e.g., 10.11.12.13. The network service application 230 responds (468, FIG. 4B) to the DNS query 414 using the generated DNS response 416. The generated DNS response 416 is returned to Application I 242 via kernel 404.

A process for handling a connection request at the user device 102-1 is discussed with reference to FIGS. 4A and 4C. In some embodiments, after Application I 242 receives the DNS response, Application I 242 initiates (482, FIG. 4C) a connection request 418 for establishing a connection session with a server associated with the synthesized IP address. For example, the connection request 418 is related to downloading content from or uploading content to the synthesized IP address. The connection request 418 is directed to the synthesized IP address, e.g., 10.11.12.13.

Application I 242 sends the request 418 to kernel 404. Kernel 404 generates (484, FIG. 4C) a packet 420 in accordance with the request 418. In some embodiments, packet 420 is a TCP packet/TCP request. Packet 420 includes a field, e.g., a destination address field, specifying the synthesized IP address, e.g., 10.11.12.13.

The network service application 230 (e.g., the data manager module 231, FIG. 2) intercepts (486, FIG. 4C) packet 420 before it leaves the user device 102-1. In some embodiments, the network service application 230 (e.g., proxy/drop determination module 233, FIG. 2) determines (488, FIG. 4C) whether to drop packet 414. In some embodiments, the proxy/drop determination module 233 checks against the proxy/drop rules 256 (FIG. 2) to determine whether to drop packet 420.

In some embodiments, when the proxy/drop determination module 233 determines that packet 420 is neither a TCP packet nor a DNS packet, packet 420 is dropped (488—Yes, FIG. 4C), and the current session initiated from the Application I 242 is terminated (490, FIG. 4C). In some embodiments, when the proxy/drop determination module 233 determines that packet 420 is a connection request, e.g., a TCP request, the network service application 230 proceeds to check whether packet 420 includes a destination field which specifies a synthesized IP address. For example, the network service application 230 (e.g., the request checking module 236, FIG. 2) checks packet 420 to identify the IP address, e.g., 10.11.12.13, listed in the destination address field. The network service application 230 may check the identified IP address against the synthesized IP addresses listed in the domain tap repository 254 to determine whether the identified IP address is a synthesized IP address. The network service application 230 may also check whether the identified IP address is marked as a synthesized IP address. When the network service application 230 determines that the identified IP address is not a synthesize IP address, packet 420 is dropped (488—Yes, FIG. 4C). When the network service application 230 determines that the identified IP address, e.g., 10.11.12.13, is a synthesized IP address, the network service application 230 proceeds to process packet 420 (488—No, FIG. 4C).

In some embodiments, the network service application 230 (e.g., the request processing module 237, FIG. 2) checks the domain tag repository 254 to identify (492, FIG. 4C) a domain name associated with the synthesized IP address. For example, the request processing module 237 identifies that the domain "www.example.com" corresponds to the synthesized IP address "10.11.12.13." The request processing module 237 processes packet 420 by replacing (494, FIG. 4C) the synthesized IP address with the identified domain name to generate a packet 422. For example, the request processing module 237 replaces the synthesized IP address of "10.11.12.13" with the domain "www.example.com" in the destination address field. The network service application 230 (e.g., local proxy 238, FIG. 2) sends (496, FIG. 4C) packet 422 to the proxy server 140.

Referring to FIG. 4A, the proxy server 140 receives packet 422. The proxy server 140 (e.g., domain validation module 380, FIG. 3) checks whether the domain name included in packet 422 is zero-rated. For example, the domain validation module 380 compares the domain name www.example.com identified from packet 422 against the domain whitelist(s) 360 stored at the proxy server 140. When the domain validation module 380 determines that the domain name is not included in the domain whitelist(s) 360, the proxy server 140 drops packet 422. In some embodiments, the proxy server 140 may send a notification message to the user device 102-1 to notify the user that the attempt to connect to domain www.example.com failed, because www.example.com is not a zero-rated content provider.

When the domain validation module 380 determines that the domain name is included in the domain whitelist(s) 360, the proxy server 140 (e.g., IP identification module 384, FIG. 3) checks the IP addresses lookup list(s) 364 to identify the real IP address for the domain name in packet 422. For example, based on the IP address lookup list(s) 364, a real IP address for the domain www.example.com on the Internet is 24.235.16.178. The proxy server 140 (e.g., the request handling module 370, FIG. 3) then forwards packet 422 to the IP address 24.235.16.178 that hosts the domain www.example.com on Internet.

Figure 5A:
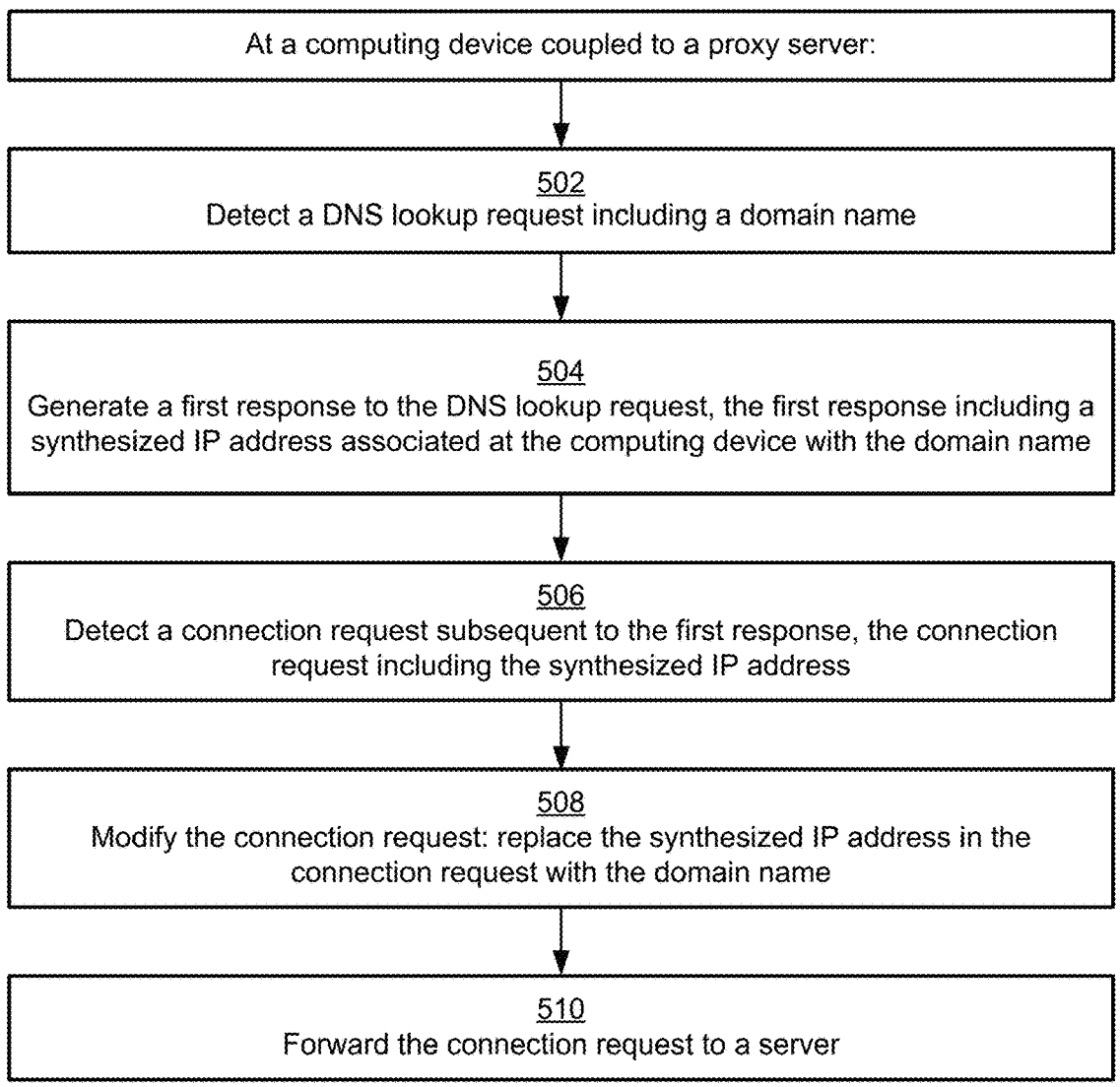
Figure 5A:
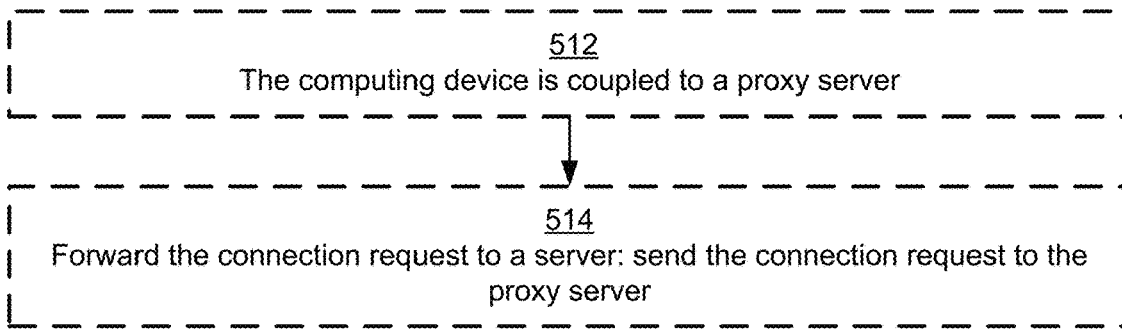

FIGS. 5A-5C are a flow diagram illustrating a method 500 for handling requests at the user device 102, in accordance with some embodiments. The method 500 is performed by a user device (e.g., a user device 102-1, FIGS. 1-2). Operations performed in FIGS. 5A-5C correspond to instructions stored in computer memories (e.g., memories 212, FIG. 2) or other computer-readable storage mediums. In some embodiments, the server system described in method 500 is the proxy server 140 (FIGS. 1 and 3). In some embodiments, the web server described in method 500 is any web server 150 (FIG. 1).

In some embodiments, the user device 102 detects (502) a DNS lookup request including a domain name. In some embodiments, the user device 102-1 (e.g., kernel 404, FIG. 4A) generates (528) a first packet corresponding to the DNS lookup request. In some embodiments, the first packet is a UDP packet. For example as illustrated in FIGS. 4A-4B, kernel 404 generates a packet 414 corresponding to the lookup request 412. The network service application 230 detects that packet 414 is a DNS lookup request that asks for an IP address of a domain name www.example.com.

In some embodiments, the DNS lookup request is initiated from (e.g., generated from) (516) a first application running on the user device 102. For example as shown in FIG. 4A, the DNS request 412 is initiated from the first application, e.g., Application I 242. In some embodiments, the network service application 230 (e.g., application identification module 232, FIG. 2) checks (518) an application ID included in the DNS lookup request (e.g., packet 414 corresponding to the request 412) to identify that the DNS lookup request is generated by the first application.

In some embodiments, the network service application 230 (e.g., DNS response generation module 235, FIG. 2) generates (504) a first response (e.g., packet 416, FIG. 4A) to the DNS lookup request. In some embodiments, the first response includes a synthesized IP address associated at the computing device with the domain name. For example, the response packet 416 includes the synthesized IP address 10.11.12.13 that is associated with the domain www.example.com locally at the user device 102-1. The synthesized IP address 10.11.12.13 is not associated with the domain name www.example.com at the DNS level outside of the user device 102-1.

In some embodiments, the DNS lookup request is (532) a first request of a plurality of DNS lookup requests including respective domain names. In some embodiments, the network service application 230 (e.g., DNS response generation module 235, FIG. 2) responds (532) to the plurality of DNS lookup requests with responses including respective synthesized IP addresses associated at the user device 102-1 with the respective domain names. In some embodiments, within the user device 102-1, each synthesized IP address is (532) unique to a respective domain name.

In some embodiments, the first response is (520) generated by a second application running on the user device 102. The second application is distinct from the first application. For example, the second application is the network service application 230, and the first application is Application I 242. The second application sends (520) the first response from the second application, e.g., the network service application 230, to the first application, e.g., Application I 242. In some embodiments, the second application, such as the network service application 230, provides access to zero-rated web services.

In some embodiments, the second application generates (524) the synthesized IP address. For example, the network service application 230 (e.g., domain tag module 234, FIG. 2) generates the synthesized IP address 10.11.12.13 to be associated with the domain name www.example.com. In some embodiments, the second application stores (524) the synthesized IP address in the user device 102. For example, the network service application 230 (e.g., domain tag module 234, FIG. 2) stores the synthesized IP address 10.11.12.13 in association with the domain www.example.com in the domain tag repository 254. In some embodiments, the synthesized IP address is (526) generated randomly at the user device 102-1.

In some embodiments, the user device 102 detects (506) a connection request subsequent to the first response. The connection request includes the synthesized IP address. In some embodiments, the user device 102-1 (e.g., kernel 404, FIG. 4A) generates (530) a second packet corresponding to the connection request. In some embodiments, the second packet is a TCP packet. For example as illustrated in FIGS. 4A-4B, kernel 404 generates a packet 420 corresponding to the connection request 418. In some embodiments, the connection request is initiated from (e.g., generated from) (516) the first application running on the user device 102. For example as shown in FIG. 4A, the connection request 418 is initiated from the first application, e.g., Application I 242.

In some embodiments, the network service application 230 (e.g., request processing module 237, FIG. 2) modifies (508) the connection request. The network service application 230 (e.g., request processing module 237, FIG. 2) replaces the synthesized IP address in the connection request with the domain name. For example, as illustrated in FIGS. 4A and 4C, the request processing module 237 replaces the synthesize IP address 10.11.12.13 in packet 420 with the domain name www.example.com to obtain packet 422. The network service application 230 (e.g., local proxy 238, FIG. 2) forwards (510) the connection request to a server. In some embodiments, the user device 102 is (512) coupled to the proxy server 140 as shown in FIG. 1. In some embodiments, the local proxy 238 forwards (514) the connection request (e.g., packet 422) to the proxy server 140.

In some embodiments, the connection request is (534) a first connection request. The user network service application 230 (e.g., request checking module 236, FIG. 2) detects (536) a second connection request including an IP address that is not one of the synthesized IP addresses. In accordance with a determination that the second connection request does not include one of the synthesized IP addresses, the second connection request is (538) dropped.

Figure 6A:
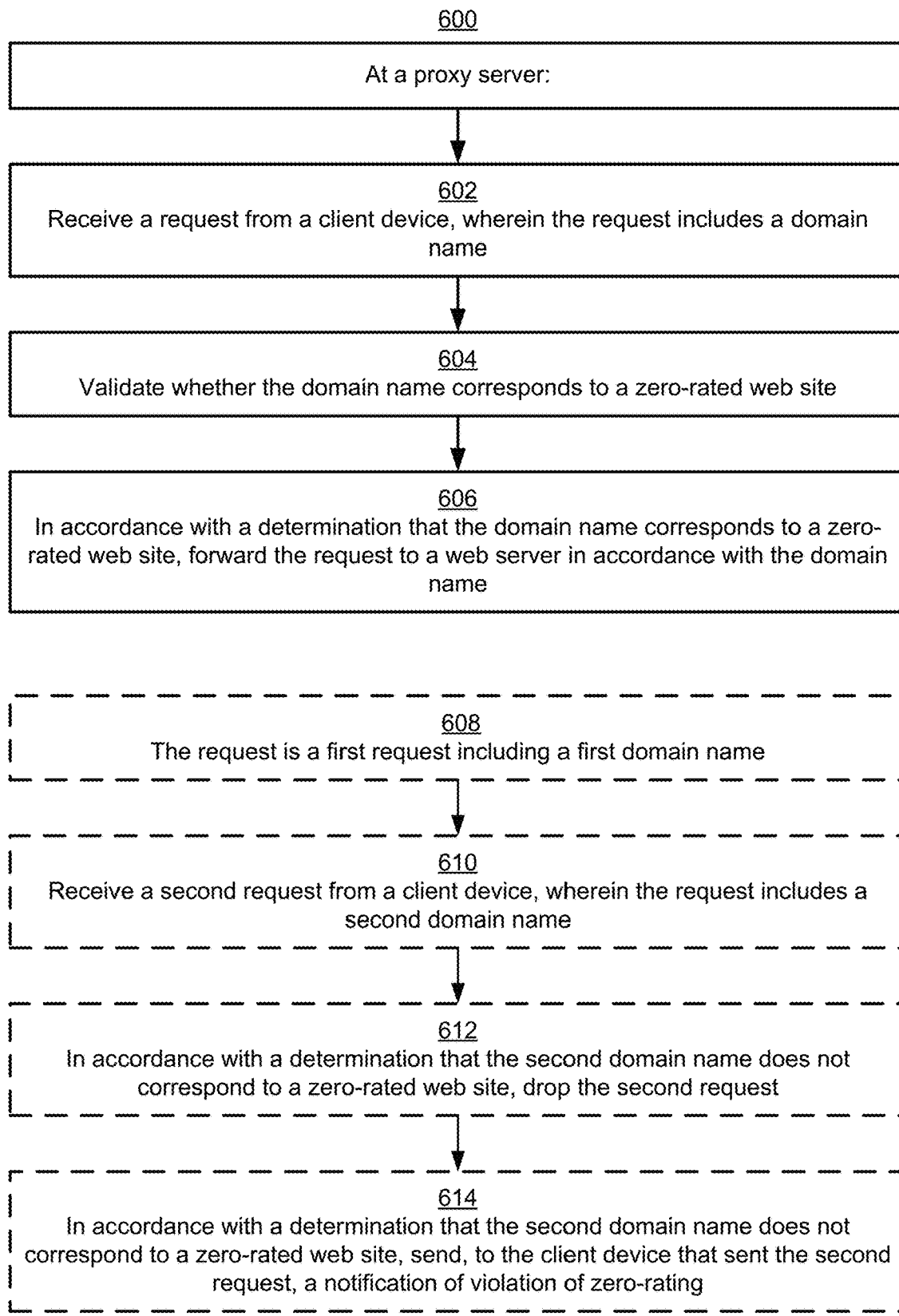
FIGS. 6A-6B are a flow diagram illustrating a method for handling requests at a proxy server coupled to a user device, in accordance with some embodiments.
Figure 6B:
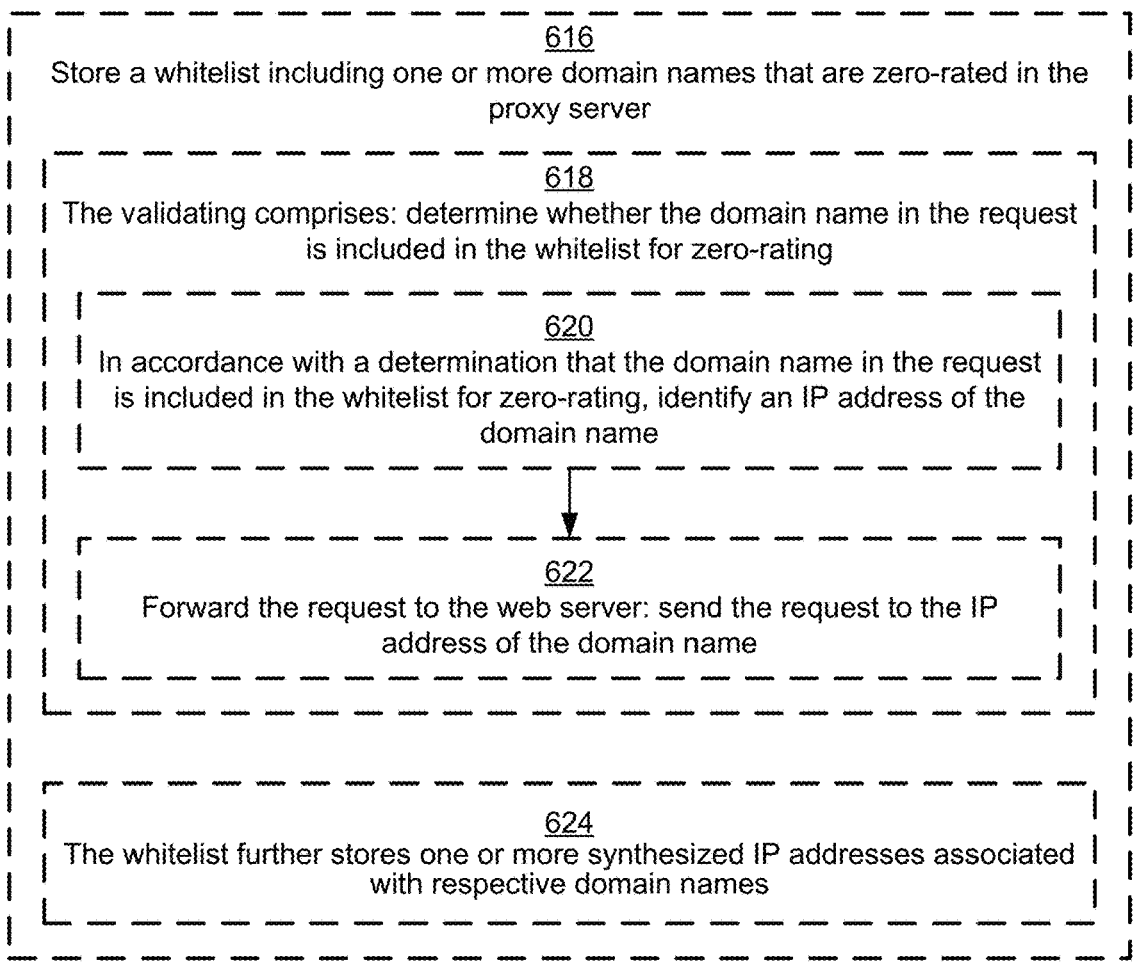

FIGS. 6A-6B are a flow diagram illustrating a method 600 for handling requests at a proxy server coupled to a user device, in accordance with some embodiments. The method 600 is performed by a server system, (e.g., the proxy server 140, FIGS. 1 and 3). The proxy server 140 is coupled to a plurality of user devices 102 and a plurality of web servers 150. Operations performed in FIGS. 6A-6B correspond to instructions stored in computer memories (e.g., memories 306, FIG. 3) or other computer-readable storage mediums. In some embodiments, the user device described in method 600 is a user device 102 (FIGS. 1-2). In some embodiments, the web server described in method 600 is any web server 150 (FIG. 1).

In some embodiments, the proxy server 140 (e.g., the request handling module 370, FIG. 3) receives (602) a request from a user device. The request includes a domain name. For example, as illustrated in FIGS. 4A and 4C, the proxy server 140 receives a request packet 422 from the user device 102-1. The request packet 422 includes a domain name www.example.com in the destination address field.

In some embodiments, the proxy server 140 (e.g., the domain validation module 380, FIG. 3) validates (604) whether the domain name in the request corresponds to a zero-rated web site. In some embodiments, the proxy server stores (616) a whitelist (e.g., the domain whitelist(s) 360, FIG. 3) including one or more domain names that are zero-rated in the proxy server 140. In some embodiments, the whitelist further stores (624) one or more synthesized IP addresses associated with respective domain names. In some embodiments, the domain validation module 380 determines (618) whether the domain name in the request is included in the whitelist for zero-rating. For example, the domain validation module 380 compares the domain www.example.com included in the request against the domain whitelist(s) 360 to determine whether the domain www.example.com is a zero-rated content provider.

In some embodiments, in accordance with a determination that the domain name corresponds to a zero-rated web site, the proxy server 140 (e.g., the request handling module 370, FIG. 3) forwards (606) the request to a web server in accordance with the domain name. For example, when the domain validation module 380 determines that the domain name www.example.com is included in the domain whitelist(s) 360, the request handling module 370 forwards the request to the web server 150-1 associated with the domain name www.example.com.

In some embodiments, in accordance with a determination that the domain name in the request is included in the whitelist for zero-rating, the proxy server 140 (e.g., the IP identification module 384, FIG. 3) identifies (620) an IP address of the domain name. In some embodiments, the request handling module 370 sends (622) the request to the IP address of the domain name. For example, the IP identification module looks up the IP addresses lookup list(s) 364 for a real IP address, e.g., 24.235.16.178, for the domain www.example.com. The request handling module 370 then sends packet 422 to the web server 150-1 associated with the identified real IP address.

In some embodiments, the request is (608) a first request including a first domain name, e.g., www.example.com. The proxy server 140 (e.g., the request handling module 370, FIG. 3) receives (610) a second request from a client device (e.g., the user device 102-i). The second request includes (610) a second domain name that is distinct from the first domain name (e.g., www.example.com). In some embodiments, in accordance with a determination that the second domain name does not correspond to a zero-rated web site, the second request is (612) dropped. For example, when the domain validation module 380 determines that the second domain name is not included in the domain whitelist(s) 360, the second request is related to a request for non-zero-rated content, thus the second request is dropped. In some embodiments, in accordance with a determination that the second domain name does not correspond to a zero-rated web site, the proxy server 140 (e.g., the request handling module 370, FIG. 3) sends (614) a notification of violation of zero-rating to the user device 102-i that sent the second request.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:
1. A method, comprising:
at a network service application on a computing device having one or more processors, one or more applications, and memory storing instructions for execution by the one or more processors:
intercepting, from an application on the computing device distinct from the network service application, a DNS lookup request including a domain name;
generating a first response to the DNS lookup request, the first response including a synthesized IP address associated, at the computing device, with the domain name;
storing the first response in the memory;
sending the first response to the application;
detecting a connection request from the application subsequent to sending the first response, the connection request including an IP address;
comparing the IP address to the synthesized IP address stored in the memory; and in accordance with a determination that the IP address matches the synthesized IP address:
modifying the connection request by replacing the synthesized IP address in the connection request with the domain name; and
forwarding the modified connection request to a proxy server to determine whether the domain name included in the connection request is zero-rated.

2. The method of claim 1, further comprising, at the computing device, checking an application ID included in the DNS lookup request to identify that the DNS lookup request is generated by the first application.

3. The method of claim 1, wherein:
the first response is generated by a second application running on the computing device, the second application being distinct from the first application; and
the method further comprises sending the first response from the second application to the first application.

4. The method of claim 3, wherein the second application provides access to zero-rated web services.

5. The method of claim 3 further comprising:
generating, by the second application, the synthesized IP address.

6. The method of claim 5, wherein the synthesized IP address is generated randomly at the computing device.

7. The method of claim 1, wherein:
the DNS lookup request is a first request of a plurality of DNS lookup requests including respective domain names;
the method further comprises, at the computing device, responding to the plurality of DNS lookup requests with responses including respective synthesized IP addresses associated at the computing device with the respective domain names; and
within the computing device, each synthesized IP address is unique to a respective domain name.

8. The method of claim 7, wherein the connection request is a first connection request, the method further comprising:
detecting a second connection request including an IP address that is not one of the synthesized IP addresses; and
in accordance with a determination that the second connection request does not include one of the synthesized IP addresses, dropping the second connection request.

9. The method of claim 1, further comprising:
generating a first packet corresponding to the first request, wherein the first packet is a UDP DNS packet; and
generating a second packet corresponding to the connection request, wherein the second packet is a TCP packet.

10. A non-transitory computer-readable storage medium storing one or more programs configured for execution by one or more processors of a computing device, the one or more programs including instructions for:
intercepting, by a network service application, a DNS lookup request including a domain name, from an application distinct from the network service application;
generating a first response to the DNS lookup request, the first response including a synthesized IP address associated, at the computing device, with the domain name;
storing the first response in memory of the computing device;
sending the first response to the application;
detecting a connection request from the application subsequent to sending the first response, the connection request including an IP address;
comparing the IP address to the synthesized IP address stored in the memory; and
in accordance with a determination that the IP address matches the synthesized IP address:
modifying the connection request by replacing the synthesized IP address in the connection request with the domain name; and
forwarding the modified connection request to a proxy server to determine whether the domain name included in the connection request is zero-rated.

* * * * *